United States Patent Office 3,471,577
Patented Oct. 7, 1969

3,471,577
2-CHLORO-5-HIGHER ALKYLPHENOL PREPARATION BY PARTIAL HYDROLYSIS OF 1,2-DICHLORO-5-HIGHER ALKYLBENZENES
Albert H. Haubein, Newark, and Horace E. Hood, Wilmington, Del., assignors to Hercules Incorporated, a corporation of Delaware
No Drawing. Continuation-in-part of application Ser. No. 148,037, Oct. 27, 1961. This application Sept. 7, 1965, Ser. No. 485,596
Int. Cl. C07c 39/28
U.S. Cl. 260—623                 7 Claims

ABSTRACT OF THE DISCLOSURE

Method for the alkaline hydrolysis of 1,2 - dichloro-5 - higher alkylbenzene to 2 - chloro - 5 - higher alkylphenol, substantially free of isomers thereof.

---

This application is a continuation-in-part of copending application Serial No. 148,037 filed October 27, 1961, now abandoned.

This invention relates to the preparation of certain chloro-higher alkylphenols and more particularly to the preparation of 2 - chloro - 5 - isopropylphenol and 2-chloro - 5 - t - butylphenol.

There are numerous routes to the production of 2-chloro - 5 - alkylphenols but they all involve several steps and the separation of isomers at each of the various steps. In the preparation of 2 - chloro - 5 - methyl phenol, Kraay (Rec. trav. chim. 49, 1082–92(1930)) chlorinated toluene and separated 1,2 - dichloro - 5 - methylbenzene by distillation from the dichlorotoluene isomers produced and then subjected the 1,2 - dichloro - 5-methylbenzene to hydrolysis whereby 2 - chloro - 5-methyl phenol in admixture with an isomer which appeared to be 2 - chloro - 4 - methyl phenol was produced. Both isomers of this mixture boil at 196° C./760 mm. and thus are not readily separable by distillation. Kraay was able to effect the separation in this case by crystallization, however, since the 2 - chloro - 5 - methyl phenol isomer was crystallizable. In the case of 2 - chloro-higher alkylphenols a corresponding mixture of isomers would not be as readily separable since the isomers are liquids and their boiling points are not sufficiently far apart for easy separation.

It is an object of the present invention to produce 2-chloro - 5 - higher alkylphenols substantially free of the position isomers thereof. It is a further object to produce a 2 - chloro - 5 - higher alkylphenol substantially free of position isomers thereof by hydrolysis of 1,2- dichloro - 5 - higher alkylbenzene. It is a still further object to produce a 2 - chloro - 5 - higher alkylphenol substantially free of position isomers thereof by hydrolysis of a mixture of 1,2 - dichloro - 5 - higher alkylbenzene and 1,2 - dichloro - 3 - higher alkylbenzene such as is produced by alkylation of o - dichlorobenzene. These objects are accomplished by the present invention.

In accordance with the present invention, it has now been found that 2 - chloro - 5 - higher alkylphenol is produced to the substantial exclusion of 2 - chloro - 4-higher alkylphenol when 1,2 - dichloro - 5 - higher alkylbenzene is subjected to alkaline hydrolysis and the alkyl is a branched chain alkyl of at least 3 carbon atoms.

It has been found further that the 1,2 - dichloro-5-higher alkylbenzene subjected to the alkaline hydrolysis is selectively hydrolyzed over 1,2 - dichloro - 3 - higher alkylbenzene when a mixture of 1,2 - dichloro - 5 - higher alkylbenzene and 1,2 - dichloro - 3 - higher alkylbenzene is subjected to the alkaline hydrolysis.

Although it was to be expected by analogy with Kraay's teachings that one of the two chlorines in a 1,2-dichloro - 5 - higher alkylbenzene could be hydrolyzed, it was a surprising discovery of the present invention that only the chlorine in the 1 - position is hydrolyzed in this group of dichloro compounds.

It was a further surprising discovery to find that the mixture containing the related isomer, namely, 1,2 - dichloro - 3 - higher alkylbenzene, which is the normal contaminant of 1,2 - dichloro - 5 - higher alkylbenzene when produced by the alkylation of o - dichlorobenzene, is also useful in the hydrolysis process when this isomer is present in less than about 15% of the isomeric mixture and the hydrolysis is carried to less than complete conversion so that the residual mixture of unreacted 1,2-dichloro - 5 - higher alkylbenzenes does not contain more than about 50% of 1,2 - dichloro - 3 - higher alkylbenzene.

The 1,2 - dichloro - 5 - higher alkylbenzenes which give the surprising selectivity in the hydrolysis process of this invention are those in which the higher alkyl group is a branched chain alkyl group the first member of which is the 3 carbon isopropyl group. Other such higher alkyl groups are sec - butyl, t - butyl, sec - amyl, t - amyl, t - octyl (obtained from diisobutylene) and sec-octyl. There is no reason to expect that even higher alkyl groups are not equally operable since the selectivity appears to increase with increasing carbon content.

The 1,2 - dichloro - 5 - higher alkylbenzenes useful in this invention are capable of being produced by alkylation of o - dichlorobenzene by known processes of alkylation with sulfuric acid or Friedel-Crafts catalysts using either the olefin or alkyl halide as reactant. When a pure 1,2 - dichloro - 5 - higher alkylbenzene is used in accordance with this invention, it is immaterial how it is produced. However, when a mixture of 1,2 - dichloro-5 - higher alkylbenzene and 1,2 - dichloro - 3 - higher alkylbenzene is used, the above method of production is particularly advantageous since the mixture so produced contains 85–90% 1,2 - dichloro - 5 - higher alkylbenzene, and no other isomer other than 1,2 - dichloro - 3 - higher alkylbenzene and this mixture when subjected to the hydrolysis of this invention gives a 2 - chloro - 5 - higher alkylphenol of surprisingly high purity without the necessity for careful fractional distillation for separation of isomers.

By alkylation of o - dichlorobenzene using propylene as the alkylation reagent and a special catalyst, there is obtained an alkylation product of which 90% is 1,2-dichloro - 5 - isopropylbenzene. This special catalyst is produced by reacting equal mole weights of aluminum chloride, isopropyl chloride, and o - dichlorobenzene in the order named at a temperature below 40° C. and then adding a second equal mole weight isopropyl chloride. For alkylation with other olefins, the corresponding catalyst prepared from the corresponding alkyl halide produces equally good results.

The alkylation is carried out with this special catalyst by gradual addition of catalytic amounts of the catalyst, in an amount in the range of 0.1–5% based on o-dichlorobenzene, to the o-dichlorobenzene while adding the olefin as rapidly as reaction takes place, but not in excess of the rate at which alkylation proceeds, at a temperature in the range of 50–150° C. The catalyst is inactivated by water or alcohol as soon as the alkylation is complete so as to avoid subsequent isomerization of the product. The amount of catalyst is based on its $AlCl_3$ content.

By hydrolysis of the 1,2-dichloro-5-higher alkylbenzene under conditions known for hydrolysis of the chlorine of the o-dichlorobenzene to o-chlorophenol, there is here produced only one of the two theoretically possible isomers, namely, 2-chloro-5-higher alkylphenol, as a result of the hydrolysis of only the chlorine in the 1-position and without hydrolysis of any in the 2-position.

The 1,2-dichloro-5-higher alkylbenzene, produced by alkylation of 1,2-dichlorobenzene in the presence of an alkylation catalyst, is usually separated from 1,2-dichloro-3-higher alkylbenzene when a pure product is desired. However, when 1,2-dichloro-5-higher alkylbenzene constitutes about 85–90% of the mixture of isomers subjected to the hydrolysis, this is not necessary since separation of the desired phenol is adequate for most commercial purposes and by the process of this invention the 1,2-dichloro-3-higher alkylbenzene is much more resistant to the hydrolysis.

Means for maintaining uniformity of the temperature in the reaction mixture is desirable. This is accomplished by some form of mixing by stirring, pumping or the like.

When pure 1,2-dichloro-5-higher alkylbenzene is subjected to the hydrolysis, there is only one monochloroalkyl phenol produced and the reaction may be continued until all of the dichloroalkylbenzene is hydrolyzed to the monochloroalkyl phenol. It is desirable, however, to carry the reaction short of completion and to recycle unreacted dichloroalkylbenzene to an alkylation or isomerization step. This is a practical procedure in the interest of time saving.

When a mixture of 1,2-dichloro-5-higher alkylbenzene and 1,2-dichloro-3-higher alkylbenzene is subjected to the hydrolysis, the reaction is carried out to an extent short of complete hydrolysis depending on the degree of purity and freedom from the isomer which is desired. In the case where the higher alkyl group is isopropyl, it is preferable to stop the hydrolysis when the concentration of the 1,2-dichloro-5-isopropylbenzene reaches about 50% of the unreacted dichloroisopropylbenzene. In the case where the higher alkyl has 4 or more carbons, the hydrolysis may be carried forward to well beyond the point where the concentration of the 1,2-dichloro-5-higher alkylbenzene reaches 50% of the unreacted dichloroalkylbenzene mixture. In the case of 1,2-dichloro-5-t-butyl-benzene, the rate of hydrolysis of this isomer is so much greater than the rate of hydrolysis of the 1,2-dichloro-3-t-butylbenzene that the hydrolysis may be continued to less than 40% unreacted 1,2-dichloro-5-t-butylbenzene without contamination of the product with 2-chloro-3-t-butylphenol.

In any case where there is recovered unreacted dichloroalkylbenzene low in 1,2-dichloro-5-higher alkylbenzene that recovered material may be isomerized to increase the content of 1,2-dichloro-5-higher alkylbenzene for reuse in the hydrolysis. Alternatively, the recovered material may be recycled to the alkylation process as indicated hereinbefore. By this means it becomes unnecessary to use fractional distillation which requires columns of many plates to concentrate the desired isomer. The process of this invention including the integration with the isomerization and alkylation steps are set forth in the following diagram:

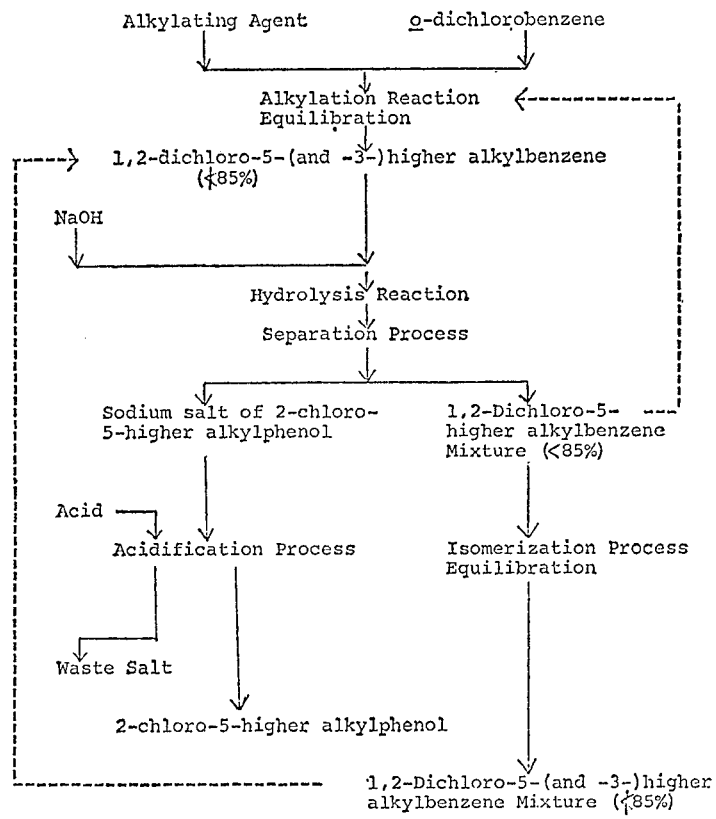

The unexpected advantage of the present invention which results from the selective hydrolysis of the 1,2-dichloro-5-higher alkylbenzene to 2-chloro-5-higher alkylphenol lies in the production of a single chloro higher alkylphenol of high purity or at least a chloro higher alkylphenol contaminated with only a single isomer which may be present in very low concentration. This is quite in contrast to the situation which prevails in the hydrolysis of a pure 1,2-dichloro-5-methylbenzene, which always produces a mixture, and which also prevails to even a greater extent in the hydrolysis of 1,2-dichloro-5-methylbenzene contaminated by a mixture of dichloromethylbenzenes each of which contributes isomeric phenols to the product.

The alkaline hydrolyzing agent used in the hydrolysis step is an alkali or alkaline earth metal hydroxide. This agent is preferably used in an alcohol solution wherein the alcohol has 1–6 carbon atoms. When using an alcohol, it is preferable that it contain little or no water, and when it contains no water, the hydrolyzing agent may be produced from the metal alkoxide corresponding to the alcohol used. Thus, in a water-free alcohol solution, sodium methoxide may be used, and water may be added to hydrolyze part or all of the sodium methoxide. When sodium methoxide is present, the phenol ether is usually first produced, and the methyl ether is then hydrolyzed by sodium hydroxide as a subsequent reaction. Thus, sodium hydroxide in this case is essential, and the sodium methoxide, while advantageous, is not requisite to the over-all process. While aliphatic alcohols are preferred, ethylene glycol, propylene glycol and higher polyhydric liquid alcohols may be used.

The hydrolysis reaction takes place at a temperature above about 150° C., and the upper temperature, being limited by the critical temperature of the solvent, is, in the case of methanol, about 240° C. Pressure is used in order to keep the alcohol liquid where required by the process so as to maintain a solution.

The hydrolysis process of this invention is specific in that it effects hydrolysis of only the chlorine in the 1-position, i.e., meta to the alkyl group. The chlorine in the 2-position is not attacked in this process and no monochloroalkylphenol derived from such a hydrolysis is found in the products.

The practical method for carrying out the hydrolysis step is to heat the dichloro higher alkylbenzene with an excess over theory of alkali or alkaline earth metal hydroxide dissolved in methyl alcohol at a temperature in the range of about 150–240° C.

In the hydrolysis step, sodium hydroxide is the preferred alkali metal hydroxide, and barium hydroxide is the preferred alkaline earth metal hydroxide. Potassium hydroxide and calcium hydroxide are also useful in the hydrolysis.

The process of this invention is illustrated by the following examples where parts and percentages are by weight.

Example 1

A catalyst made from 30 parts aluminum chloride, 68 parts isopropyl chloride and 33 parts o-dichlorobenzene was used in the propylation of o-dichlorobenzene by adding 15 parts catalyst to 487 parts dry o-dichlorobenzene in a nitrogen atmosphere at 105° C. and gradually adding propylene gas at the rate of 0.98 part per minute for 317 minutes. The catalyst was then destroyed by adding water and washing to neutrality first with 50% aqueous sodium hydroxide and then with water. The resulting alkylate contained 26% o-dichlorobenzene, 1% 1,2-dichloro-3-isopropyl, 31% 1,2-dichloro-5-isopropyl and 13% diisopropyldichlorobenzene. The 1,2 - dichloroisopropylbenzene fraction containing both isomers was separated by distillation.

A mixture of 3400 parts of this 1,2-dichloro-5-isopropylbenzene fraction, analyzing 90% 1,2-dichloro-5-isopropylbenzene, and 2280 parts sodium hydroxide dissolved in 4600 parts methanol was placed in an autoclave fitted with a stirrer and heated for 5 hours under autogenous pressure at about 200° C. The mixture was then cooled and filtered, and the methanol was distilled off and replaced by an equal volume of water. To the resulting solution was added enough 37% hydrochloric acid to neutralize about one-half of the remaining alkali, and one-half of the resulting solution was extracted with about 900 parts hexane taken in three equal portions. The total hexane extract from the whole solution yielded 1332 parts dichloroisopropylbenzene. The aqueous layers from each of 2 portions were acidified with 37% hydrochloric acid and extracted with 900 parts hexane in 3 portions. From the combined hexane extracts there was obtained 1642 parts phenolic product which analyzed 4.3% 2-chloro-3-isopropylphenol, and 69% 2-chloro-5-isopropylphenol. This product was subjected to distillation, and 600 parts yielded 450 parts 2-chloro-5-isopropylphenol boiling at 151–154° C./0.5 mm. This analyzed about 6% 2-chloro-3-isopropylphenol and over 90% 2-chloro-5-isopropylphenol.

Example 2 o-Dichlorobenzene was alkylated with isobutylene using aluminum chloride as a catalyst, and 1,2-dichloro-5-t-butylbenzene, B.P. 122° C./17 mm., was obtained as a mixture containing about 85% 1,2-dichloro-3-t-butylbenzene.

A mixture of 340 parts of this 1,2-dichloro-5-t-butylbenzene and 228 parts sodium hydroxide in 460 parts methanol was placed in an autoclave and treated as in Example 1. The product of this hydrolysis was 2-chloro-5-t-butylphenol, B.P. 102° C./50 mm., $N_D^{30}$ 1.5454.

Example 3

A mixture of dichloroisopropylbenzene analyzing 50.3% 1,2-dichloro-5-isopropylbenzene, 49.3% 1,2 - dichloro-3-isopropylbenzene and 1.4% unknown substances amounting to 144 parts was placed in a nickel rocking-autoclave with 136 parts sodium hydroxide in 275 parts methanol and heated, with agitation, for 5 hours at 200° C. The resulting mixture was diluted with water, acidified with HCl and extracted with ether. The ether extract was then washed with 10% aqueous sodium hydroxide to remove phenolics. The ether extract containing unreacted starting material was then freed of solvents and analyzed by gas chromatography. A sample of dichloroisopropylbenzene used as original reactant was similarly analyzed. The results of these analyses are tabulated below:

| | Dichloroisopropylbenzene Analysis | | After Partial (67%) Hydrolysis and Removal of Phenolics | | | |
|---|---|---|---|---|---|---|
| | | | Unreacted | | Reacted | |
| Compound | Percent | Parts by Weight | Percent | Parts by Weight | Percent | Parts by Weight |
| Unknowns | 1.4 | 1.4 | 6.6 | 2.2 | | |
| 3-isopropyl | 49.3 | 49.3 | 56.5 | 18.7 | 62.0 | 30.6 |
| 5-isopropyl | 50.3 | 50.3 | 37.2 | 12.3 | 75.5 | 38.0 |
| Total | 101.0 | 101.0 | 100.3 | 33.2 | | |

The tabulation shows that the dichloroisopropylbenzene mixture used as starting material was 50.3% 1,2-dichloro-5-isopropylbenzene and 49.3% 1,2-dichloro-3-isopropylbenzene; that the recovered unreacted chlorinated cumene mixture was 37.2% 1,2-dichloro-5-isopropylbenzene and 56.5% 1,2 - dichloro - 3 - isopropylbenzene. Based on parts by weight, 50.3 parts 1,2-dichloro-5-isopropylbenzene in the starting mixture was diminished to 12.3 parts by weight unreacted in the hydrolysis mixture, indicating by difference (50.3−12.3=38.0) that 38 parts by weight reacted, or that 75.5% (38.0÷50.3=0.755 or 75.5%) reacted. Based on parts by weight, 49.3 parts 1,2-dichloro-3-isopropylbenzene in the starting mixture was diminished to 18.7 parts by weight in the unreacted portion of the hydrolysis, indicating by difference (49.3−18.7=30.6)

that 30.6 parts by weight reacted or that 62.0%

(30.6÷49.3=0.62)

reacted.

These results clearly show that the selective hydrolysis of the 1,2-dichloro-5-higher alkylbenzene in admixture with 1,2-dichloro-3-higher alkylbenzene prevails even when the 1,2-dichloro-5-higher alkylbenzene is the major component.

This unexpected superiority of the present invention with respect to the hydrolysis of a mixture of 1,2-dichloro-5-higher alkylbenzenes and 1,2-dichloro-3-higher alkylbenzenes is particularly applicable to other dichloro higher alkylbenzenes than dichlorocumenes as shown by the following example showing the hydrolysis of a mixture of dichloro-t-butylbenzenes in which 87.9% was 3,4-dichloro-t-butylbenzene and 6.2% was 2,3-dichloro-t-butylbenzene.

of 3.4 parts phenolics from the dichloro-t-butylbenzene corresponds to 3.75 parts dichloro-t-butylbenzene hydrolyzed, or 7.65%, which is the percent dichloro-t-butylbenzene reacted. The original dichloro-t-butylbenzene analysis and that of the recovered dichloro-t-butylbenzene is calculated below:

| | Dichloro-t-butylbenzene Original Analysis | | Dichloro-t-butylbenzene After Partial Hydrolysis (7.65%) and Removal of Phenols Analysis | | | |
|---|---|---|---|---|---|---|
| | | | Unreacted 92.35% | | Reacted | |
| Compound | Percent | Parts by weight | Percent | Parts by weight | Percent | Parts |
| Unknowns | 6.0 | 6.0 | 6.0 | 5.5 | | |
| -3-t-butyl | 6.2 | 6.2 | 7.1 | 6.5 | 0 | 0 |
| -5-t-butyl | 87.9 | 87.9 | 86.9 | 80.2 | 8.9 | 7.7 |

Example 4

A mixture of dichlor-t-butylbenzenes was prepared by adding 170 grams t-butylchloride dropwise, with stirring, over a 1-hour period to a mixture of 1000 grams o-dichlorobenzene and 40 grams anhydrous aluminum chloride at 0–5° C., subsequently heating for ½ hour at 80° C. and then cooling, pouring into ice water containing hydrochloric acid, separating the organic layer free of water and distilling. The fraction boiling at 120–122° C. at 15 mm. Hg pressure and amounting to 111.4 parts was taken for subsequent use in this example. This distillation cut analyzed by gas chromatography 87.9% 1,2-dichloro-5-t-butylbenzene, 6.2% 1,2-dichloro-3-t-butylbenzene, and 6% unknowns.

The hydrolysis was carried out by placing a mixture of 49 parts of the distilation cut containing 87.9% 1,2-dichloro-5-t-butylbenzene and 6.2% 1,2-dichloro-3-t-butylbenzene in a Carius tube containing 32 parts sodium hydroxide in 60 parts methanol, sealing the Carius tube and heating at 200° C. for 7 hours, cooling, removing the product, extracting the alkali-soluble phenolic therefrom with aqueous sodium hydroxide, and recovering 3.4 parts phenolics and the unreacted dichloro-t-butylbenzene mixture. The original dichloro-t-butylbenzene mixture subjected to the hydrolysis and the unreacted dichloro-t-butylbenzene recovered from the hydrolysis were analyzed by gas chromatography. The results of these analyses were as indicated below:

| | | Dichloto-t-butylbenzene | |
|---|---|---|---|
| | $t_R$ | Original (percent) | Unreacted (percent) |
| Fraction: | | | |
| 1 | 0.23 | 0.3 | .3 |
| 2 | 0.75 | 1.2 | 1.8 |
| 3 | 1.00 | 87.9 | 86.9 |
| 4 | 1.12 | 6.2 | 7.1 |
| 5 | 1.36 | .9 | 0.5 |
| 6 | 1.57 | 3.6 | 3.4 |

In this tabulation $t_R$ is a chromatography designation of relative retention time for the fraction obtained. Fraction 3 is the 1,2-dichloro-5-t-butylbenzene fraction in each case and Fraction 4 is the 1,2-dichloro-3-t-butylbenzene fraction in each case.

After hydrolysis the unreacted dichloro-t-butylbenzene was recovered. The amount of hydrolysis based on a yield In this tabulation the parts by weight of original components is taken directly from the percent composition. The percent composition of the unreacted is taken from gas chromatography analyses above. The parts by weight unreacted is 92.35% of the original dichloro-t-butylbenzene. The column headed "Reacted" shows "Parts," which is the difference between parts of original dichloro-t-butylbenzene and parts of recovered unreacted dichloro-t-butylbenzene. The percent under "Reacted" is parts reacted÷parts in original dichloro-t-butylbenzene. These data indicate that 8.9% of the original 1,2-dichloro-5-t-butylbenzene reacted and that no detectable amount of the 1,2-dichloro-3-t-butylbenzene in the original mixture reacted. These results clearly show that the superiority of the present invention in selective hydrolysis of 1,2-dichloro-5-higher alkylbenzene in the presence of 1,2-dichloro-3-higher alkylbenzene applies particularly well to the mixture of 1,2-dichloro-5-t-butylbenzene and 1,2-dichloro-3-t-butylbenzene.

Example 5

A mixture of 3200 parts dichloroisopropylbenzene (about 90% 1,2-dichloro-5-isopropylbenzene, about 10% 1,2-dichloro-3-isopropylbenzene and about 1% o-dichlorobenzene), 2250 parts sodium hydroxide and 3950 parts methyl alcohol was heated at 200° C. in a closed autoclave with agitation. Samples were removed at hourly intervals and analyzed by separating the unreacted dichloroisopropyl benzene from the water soluble portion, neutralizing the water soluble portion with acid and separating the crude chloroisopropylphenol set free.

The results of these analyses were:

| | Sample, percent of Reaction Mixture(*) | Neutral (grams) | Phenolic (grams) |
|---|---|---|---|
| Time (hr.): | | | |
| 1 | 3.3 (106) | 69.4 | 21.4 |
| 2 | 3.4 (109) | 60.5 | 32.2 |
| 3 | 3.3 (106) | 38.1 | 47.0 |
| 4 | 3.1 (99) | 38.8 | 50.4 |
| 5 | 3.5 (112) | 43.2 | 57.3 |

* Grams dichloroisopropylbenzene in fraction before heating.

The tabulation shows in the second column the weight in grams of dichloroisopropylbenzene in original reaction mixture of sample of the size taken. The column showing grams of neutral shows weight of unreacted dichloroisopropylbenzene in sample. The column showing grams of phenolic shows weight of chloroisopropylphenol in the sample.

The phenolic fraction isolated from each sample was analyzed by vapor phase chromatography with the following results:

| Hourly Sample | Percent Substance Present at Indicated $t_R$ Times | | | | | | | |
|---|---|---|---|---|---|---|---|---|
| | 1.80 | 2.83 | 4.3 | 4.7 | 6.0 | 7.3 | 9.25 | 10.88 |
| 1 | | | | .95 | T | .85 | 4.6 | 72.6 |
| 2 | | .65 | 1.65 | T | .9 | T | 5.1 | 86.3 |
| 3 | T | | 5.3 | | 1.1 | .4 | 4.7 | 83.3 |
| 4 | T | | 1.8 | T | .8 | T | 5.5 | 91.8 |
| 5 | | | T | .5 | .4 | T | 4.8 | 83.7 |

In this tabulation T indicates a trace. The compounds at $t_R$ 1.80, 2.83, 4.7 and 7.3 are unidentified but the latter two are the only positions at which 2-chloro-4-isopropylphenol or 2-chloro-3-isopropylphenol would be expected to be found. The compound at $t_R$ 4.3 is 1,2-dichloro-5-isopropylbenzene, that at 9.25 is 2-chloro-3-isopropylphenol, that at 10.88 is 2-chloro-5-isopropylphenol and that at 6.0 is o-chlorophenol which results from hydrolysis of o-dichlorobenzene in the dichloroisopropylbenzene.

The data in the tabulation show at $t_R$ 10.88 and 9.25 the percents of 2-chloro-5-isopropylphenol and 2-chloro-3-isopropylphenol from which an average ratio of the former to the latter is calculated to be 16.9 showing substantial selectivity in the hydrolysis of the 1,2-dichloro-5-isopropylphenol over the hydrolysis of the 1,2-dichloro-3-isopropylphenol.

The 2-chloro-5-higher alkylphenols are used in the preparation of 2-chloro-5-higher alkylphenyl N-methylcarbamates which are excellent insecticides and acaricides particularly when the higher alkyl is isopropyl or t-butyl.

What we claim and desire to protect by Letters Patent is:

1. The method of preparing 2-chloro - 5 - (branched chain alkyl)phenol substantially free of isomers thereof, which comprises contacting and reacting 1,2-dichloro-5-alkylbenzene, the alkyl in said benzene being the same as the alkyl in said phenol, in an alcoholic solution of a metal hydroxide of the group consisting of alkali metal hydroxide and alkaline earth metal hydroxide at a hydrolysis temperature above about 150° C.

2. The method of claim 1 in which the alkali metal hydroxide is sodium hydroxide.

3. The method of preparing 2-chloro-5-isopropylphenol substantially free of isomers thereof, which comprises contacting and reacting 1,2-dichloro-5-isopropylbenzene in an alcoholic solution of sodium hydroxide at a hydrolysis temperature above about 150° C.

4. The method of preparing 2-chloro-5-t-butylphenol substantially free of isomers thereof, which comprises contacting and reacting 2-dichloro-5-t-butylbenzene in an alcoholic solution of sodium hydroxide at a hydrolysis temperature above about 150° C.

5. The method of preparing 2-chloro-5-isopropylphenol substantially free of isomers thereof, which comprises contacting and reacting dichloroisopropylbenzene consisting essentially of at least about 85% 1,2-dichloro-5-isopropylbenzene and a complement of 1,2-dichloro-3-isopropylbenzene in an alcoholic solution of sodium hydroxide at a hydrolysis temperature above about 150° C.

6. The method of preparing 2-chloro-5-t-butylphenol substantially free of isomers thereof, which comprises contacting and reacting dichloro-t-butylbenzene consisting essentially of at least about 85% 1,2-dichloro-5-t-butylbenzene and a complement of 1,2-dichloro-3-t-butylbenzene in an alcoholic solution of sodium hydroxide at a hydrolysis temperature above about 150° C.

7. The method of preparing 2-chloro - 5 - (branched chain alkyl)phenol substantially free of isomers thereof, which comprises producing in an equilibration step an equilibration mixture of dichloro-alkylbenzenes, the alkyl in said benzenes being the same as the alkyl in said phenol, said equilibrium mixture being that obtained by contact equilibration with an alkylation catalyst of the group consisting of sulfuric acid and Friedel-Crafts catalysts, and said equilibrium mixture containing at least about 85% 1,2-dichloro-5-alkylbenzene, contacting and reacting said equilibrium mixture of dichloro-alkylbenzenes in an alcoholic solution of sodium hydroxide at a hydrolysis temperature above about 150° C.

References Cited
UNITED STATES PATENTS

| 2,126,648 | 8/1938 | Lofton et al. | 260—623 |
| 2,799,714 | 7/1957 | Widiger | 260—623 |
| 2,854,488 | 9/1958 | Widiger | 260—623 |

OTHER REFERENCES

Kraay, Rec. Chim., 49: 1082–92 (1930).

LEON ZITVER, Primary Examiner

W. B. LONE, Assistant Examiner